United States Patent
Anisimov (10) Patent No.: US 8,175,161 B1
(45) Date of Patent: May 8, 2012

(54) SYSTEM AND METHOD FOR MOTION ESTIMATION

(75) Inventor: Igor Anisimov, St. Petersburg (RU)

(73) Assignee: Arecont Vision, LLC., Glendale, CA (US)

( * ) Notice: Subject to any disclaimer, the term of this patent is extended or adjusted under 35 U.S.C. 154(b) by 908 days.

(21) Appl. No.: 12/210,007

(22) Filed: Sep. 12, 2008

(51) Int. Cl.
*H04N 7/12* (2006.01)

(52) U.S. Cl. ......... 375/240.16; 375/240.13; 375/240.12; 375/240.05; 375/240.15; 382/232; 382/239; 382/251

(58) Field of Classification Search ............. 375/240.16; 382/232, 239
See application file for complete search history.

(56) References Cited

U.S. PATENT DOCUMENTS

| | | | |
|---|---|---|---|
| 6,985,528 B2 * | 1/2006 | Shin et al. ............... | 375/240.16 |
| 7,782,953 B2 * | 8/2010 | Sriram et al. ............ | 375/240.16 |
| 2006/0188020 A1 * | 8/2006 | Wang ..................... | 375/240.16 |
| 2009/0086814 A1 * | 4/2009 | Leontaris et al. ....... | 375/240.02 |

OTHER PUBLICATIONS

"A Fast Rate-Distortion Optimization Algorithm for H.264/AVC" Zhenyu Wei et al, Electronic engineering Dept. The Chinese University of Hong Kong. ICASSP 2007, IEEE pp. 1157-1160.*

* cited by examiner

*Primary Examiner* — Taghi Arani
*Assistant Examiner* — Jason Lee
(74) *Attorney, Agent, or Firm* — Christie, Parker & Hale, LLP (57) ABSTRACT

A parallel processor for motion estimation including: a matrix of elementary processors configured in rows and columns, local connections between the elementary processors for transmitting partial results, and row outputs for outputting a set of best match values (for example, SAD values), one value for each pixel row of a current block of image pixels; and search area delay buffers coupled to each row inputs, for accepting pixels of the search area as input and forming a reference block row. The processor further includes current block delay buffers coupled to each row inputs, for accepting pixels of the current block as input; a sum module coupled to the row outputs for computing a final match value from the row outputs; and a sorting module for sequentially selecting a best match value from the final match values outputted from the sum module, and generating a corresponding motion vector.

15 Claims, 5 Drawing Sheets

SYSTEM AND METHOD FOR MOTION ESTIMATION

FIELD OF THE INVENTION

The present invention relates generally to image processing; and more particularly to a system and method for motion estimation in video image frames.

BACKGROUND

The essential feature of the up-to-date standards for compression of video images is a motion prediction method. An example of such standards is h.264 standard (MPEG 4 Part 10), which uses variable block size motion prediction. The main idea of motion prediction is tracking of changes between subsequent frames and saving only the changes, rather than full frames. Steps for a typical motion prediction process can be briefly described as:

1. the current frame is partitioned into blocks of pixels;
2. for each block, a search of the best matched block is performed in the reference (previous) frame, the position of the best matched block is represented by a motion vector;
3. a predicted frame is constructed from blocks fetched from the reference frame at the positions pointed by the motion vectors;
4. the predicted frame is subtracted from the current frame generating a prediction error;
5. the result of motion prediction is motion vectors and a prediction error.

Determination of the motion vectors is the most computationally intensive task. The process of motion vector search is usually referred to as motion estimation. Let's refer to the block of the current frame that is to be predicted as a current block; and the candidate block for prediction to be fetched from reference frame as a reference block. Then, the full search block matching method for motion estimation in most cases is described as looking over all possible reference block positions in some predetermined search area in the reference frame and choosing the position that yields the minimum prediction error. In other words, the current block is an etalon block that is compared with a number of candidate blocks (reference blocks), which yields from the search area by the moving of a sliding window over the search area. Every position represents a vector that is a candidate to be the motion vector; the best matching position with minimal prediction error represents the final motion vector. To reduce the number of search iterations, several search strategies may be used, nevertheless, a full search provides the best prediction result and minimal error. A conventional measuring method of block matching is a Sum of Squared Differences (SSD) or a Sum of Absolute Differences (SAD) of the source and reference block pixels.

In case of high resolution image processing, computational complexity becomes still higher. One way to provide a real time performance is a hardware implementation of the algorithm. For this purpose, the SAD method is employed due to the less consumption of hardware resources. A SAD measure in case of full search motion estimation is described by the following equation:

$$S(u, v) = \sum_{i=0}^{m-1} \sum_{j=0}^{n-1} |x(i, j) - h(i+u, j+v)| + \lambda R(u, v), \quad (1)$$

where x(i, j) are pixels of current block, h—pixels of search area (in the reference frame), m and n are block size, u and v are motion vector components, R(u, v) is a function representing vector coding efficiency, λ is a Lagrange multiplier, S(u, v) is a SAD value for vector (u, v). As evident from the equation (1), the base operation comprises of subtraction, obtaining the absolute value and addition. In order to provide sufficient performance objectives, a hardware implementation needs to be parallel and perform a number of operations at a time. The higher the performance is, the larger search area may be used. Parallel processing consumes lots of resources therefore the main issue of hardware implementation of motion estimation algorithm is a design of low-cost application-specific parallel processor.

SUMMARY

In some embodiments, the present invention is a parallel processor for motion estimation in a search area of video image frames including a plurality of blocks of image pixels. The parallel processor includes: a matrix of a plurality of elementary processors configured in rows and columns and having a plurality of row inputs for inputting current and reference block rows, a plurality of local connections between the elementary processors for transmitting of partial result along matrix rows, and a plurality of row outputs for outputting a set of partial match values (for example, sum of absolute differences (SAD) values), one value for each pixel row of a current block of image pixels; a plurality of search area delay buffers coupled to each row of the plurality of row inputs of the matrix, respectively, for accepting pixels of the search area as input and forming a reference block row; a plurality of current block delay buffers coupled to each row of the plurality of row inputs of the matrix, respectively, for accepting pixels of the current block as input; a sum module coupled to the plurality of row outputs for computing a final match value from the plurality of row outputs; and a sorting module for sequentially selecting a best match value from the final match values outputted from the sum module, and generating a corresponding motion vector.

The matrix of elementary processors may be configured to transmit the partial match results at every clock cycle from one elementary processor to next elementary processor, and each elementary processor may be configured to compute the partial match result for a corresponding pixel of the current block and add the computed partial match result to a partial match result received from a previous elementary processor in a same row of the matrix.

In some embodiments, the present invention is method for estimating motion in a search area of video image frames including a plurality of blocks of image pixels, using SAD. The method includes: sequencing current frame blocks in row or column frame scan order; sequentially determining a best matched block over all reference block positions in the search area according to indices u and v of equation (1); parallel computing partial results of SAD for each pixel of said current block for all i and j and for fixed u and v; adding partial SAD results in parallel with respect to i and in pipeline manner with respect to j to generate a set of row SAD results; summing said set of row SAD results in pipeline manner to generate a SAD value for entire block for fixed u and v;

sequentially obtaining a minimum of SAD values for all u and v; and outputting values of u and v corresponding to said obtained minimum of SAD value, as coordinates of a motion vector.

DETAILED DESCRIPTION

The present invention is a method and system for efficient and fast motion estimation in video image frames used in for example, video compression systems. The presented processor implements a full search block matching motion estimation algorithm. In some embodiments, the presented invention estimates motion between two consecutive frames, where for each current block of one frame, the invention searches a best matched reference block among a plurality of overlapped reference blocks in a search area of another frame. At every time step, the processor computes a measure of block matching for one position of the block in the search area. The invention provides for a significant reduction of the computational resources required for exhaustive motion estimation and a reduction of search time.

In some embodiments, the presented invention is an application-specific parallel processor for full search block matching motion estimation algorithm. The application-specific parallel processor of the present invention may be implemented in Field Programmable Gate Arrays (FPGA), Application Specific Integrated Circuit (ASIC), or any other hardware implementation. In some embodiments, the presented invention is a method for parallel implementation of full search block matching motion estimation algorithm. The method may be implemented in software to be executed by a general; purpose computer, such as a Personal Computer (PC), or a special purpose computer. Alternatively, the method of the present invention may be implemented by firmware to be executed by a Reduced Instruction Set Computer (RISC) hardware, or Digital Signal Processor (DSP) hardware or chip. Although, the invention is described with respect to SAD methods, any other block matching measures having the same index dependences as a SAD measure is applicable to the system and method of the present invention.

Figure 1:
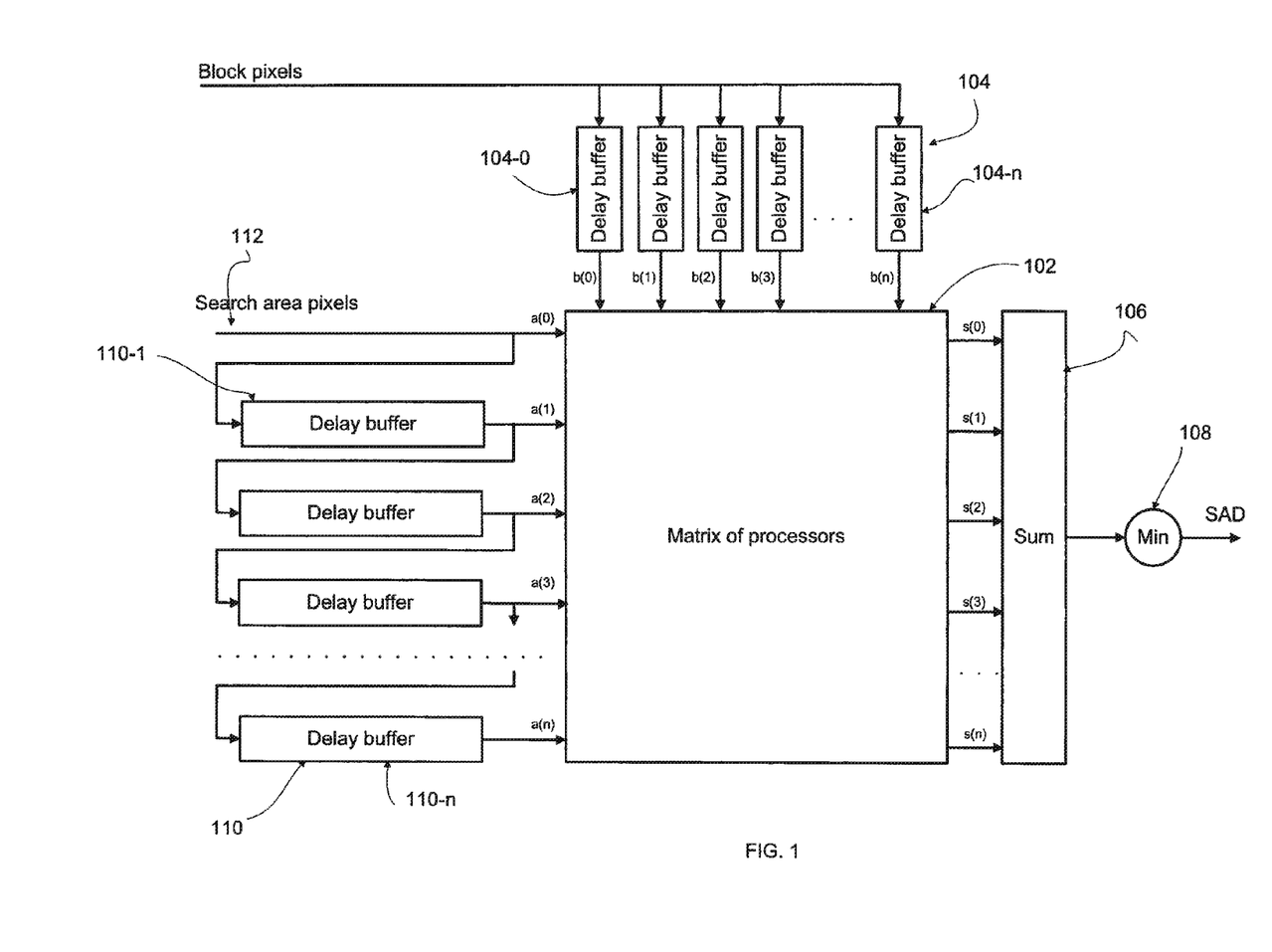
FIG. 1 is an exemplary hardware architecture of a parallel processor, according to some embodiments of the present invention.

FIG. 1 is an exemplary hardware architecture of a parallel processor, according to some embodiments of the present invention, where a(i) are rows of the search area (in a reference frame), b(i) are rows of the current block, and s(i) are partial SAD results. Although, both a(i) and b(i) are row inputs to the matrix, to simplify the drawings, b(i) are shown on the top.

As shown, the parallel processor comprises a matrix 102 of elementary processors (EPs), a number of delay buffers 104 for accepting block pixels and including delay buffers 104-0 to 104-n, a number of delay buffers 110 for accepting search area pixels and including delay buffers 110-1 to 110-n, a sum module 106 for partial match value (for example, SAD value) additions, and a sorting (min) module 108 for (sequentially) selecting the best match values (for example, minimum SAD values) and the corresponding vector, that is, selecting a best match value from the final match values outputted from the sum module, and generating a corresponding motion vector. The delay buffers provide scheduling of input data. The matrix of EPs 102 computes and transmits partial match values in parallel for every position of the reference block fetched from the search area. The partial match values are moved clock by clock from one EP to another. Each EP computes the match value for a corresponding block pixel and adds the match value to result received from a previous processor in a same row of the matrix 102. The output of the matrix is a set of match values, one value for each row of a pixel block. Subsequently, the partial match value of each row is summed (by the sum module 106) to obtain the final match value for the current block position in the search area of the reference frame. The min module 108 generates x and y coordinates for each reference block position, selects the minimum match value and saves corresponding to the value coordinates in output registers. These coordinates represent the final motion vector, which is the result of the motion estimation process. Although, for the purpose of simplicity, a SAD process and associated SAD values are used as examples, the present invention is not limited to SAD process.

Figure 2:
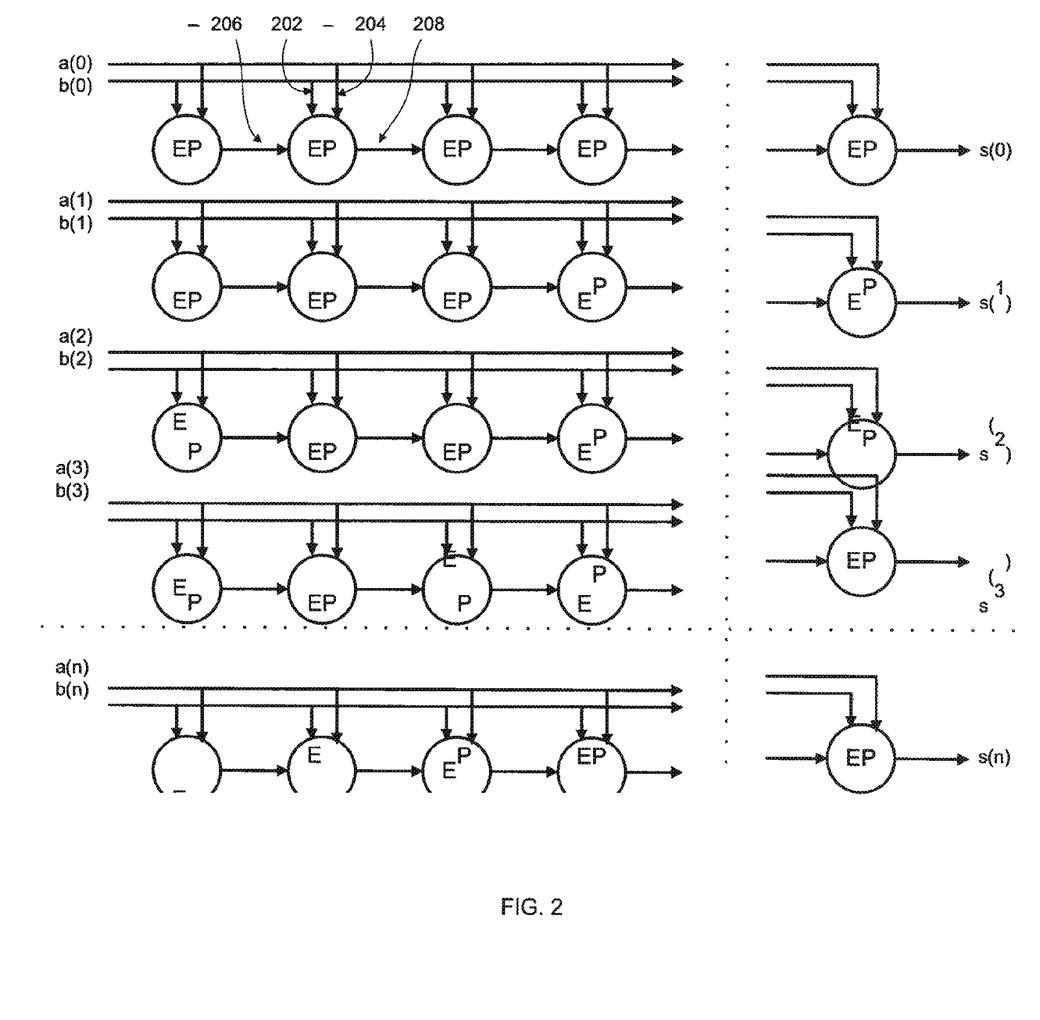
FIG. 2 is an exemplary block diagram of a matrix of elementary processors, according to some embodiments of the present invention.

FIG. 2 is an exemplary block diagram of a matrix of elementary processors, according to some embodiments of the present invention, where a is a search area pixel, b is a current block pixel, si—is a partial SAD input, and so is a partial SAD output. In some embodiments, each elementary processor has two local 206, 208 and two global connections 202, 204. The local connections are used for input and output of partial results between the processors. The global connections are used to provide processors with input data, search area pixels and current block pixels. Each EP implements a basic operation of SAD which comprises a subtraction, obtaining the absolute value, and an addition.

In some embodiments, a process for the above three basic operations, is described as follows:

$$t1 := a-b;$$

$$t2 := abs(t1);$$

$$so := si + t2; \qquad (2)$$

where a is a search area pixel, b is a current block pixel, si is the result from an adjacent EP, and so is the result of current EP. This process requires three operation units: 1-subtructer, 1-absolute value and 1-addition. In some embodiments, a process for the basic operation may be transformed as follows:

$$t1 := a-b \qquad (3)$$

if t1<0 then $$so := si - t2;$$

else $$so := si + t2;$$

end if;

The result so in this process can be computed with one operation unit adder-subtracter controlled by the sign of t1.

As a result, this process can be implemented with only two operation units, that is, one subtracter unit and one adder-subtracter unit.

Figure 3:
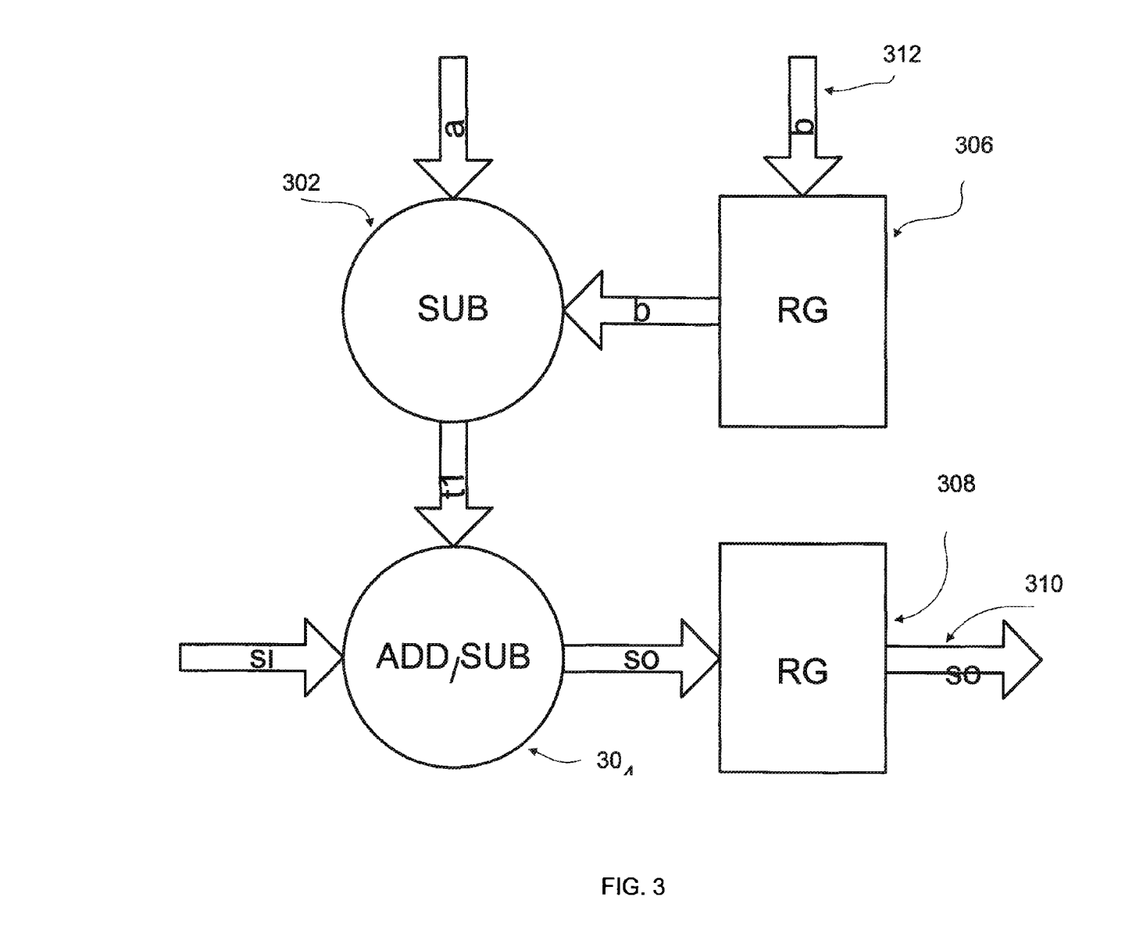
FIG. 3 is an exemplary block diagram of an elementary processor, according to some embodiments of the present invention.

In some embodiments, each EP performs the same basic operation of SAD including subtraction, obtaining the absolute value, and addition. Scheduling of the operations is provided by the input data ordering, inserting of registers 306 and 308 into the EP and inserting of delay buffers 104 and 110 into the input data path. As a result, the operations of the SAD process are distributed in space and time, for example, computation of SAD for each position is performed in parallel, however, looking over reference block positions in the search area is performed in sequence. For example, for position 1, a first SAD value is obtained, for position 2, a second SAD value is obtained, and so forth for all positions. The degree of parallelism relating to SAD operations equals to the number of pixels in the block. It means that for a block of a size 16×16, 256 operations are performed at a time. To increase overall system performance and extend the search area, the processing can be distributed among several parallel processors working simultaneously. The distribution performs by means of assignment of different blocks to the separate processors.

FIG. 3 is an exemplary block diagram of an elementary processor, according to some embodiments of the present invention. As shown, each EP includes a subtracter 302, an adder-subtracter 304, a register 308 for saving so value 310, and a register 306 for saving current block pixel b value 312. For implementations on a FPGA or ASIC, the circuit shown in FIG. 2 may be used. In some embodiments, the register 306 may be packed into the logic cells of subtracter 302. In this case, each EP requires near 24 logic cells of FPGA (for example, 12 slices of Xilinx Spartan3E™) provided that the pixel data width is 8 bit.

Referring back to FIG. 1, scheduling of operations is provided by delay buffers 104 and 110 and registers 306 and 308 of EP (shown in FIG. 3) inside matrix 102. Input data includes two streams. The first input stream is a sequence of blocks of current frame, within these blocks pixels flow in progressive scan order. The second input stream is a sequence of search areas, within these areas pixels flow in progressive scan order. The pixels of the search area arrive at the input 112 and pass through delay buffers 110 with a delay length equal to the length of the search area row. That is, every buffer 110 has a size (delay length) of 1 search area row, and a(0) to a(n) are pixels of reference block rows. Outputs of the delay buffers 110 form a sliding window a(0) to a(n) of reference block data access with a width of 1 and height of n, where n is height of the block. The sliding window runs all reference block positions in the first search area row then shifts by one pixel in vertical direction to the second row and so on until it reaches the end of the search area. Accordingly, the delay buffers 110 provide parallel access to n pixels at every reference block position in the search area. When current block is processed and motion vector for it is found it is started processing of next block in sequence. At the start of next block processing, search areas have to be exchanged that means for processor reloading delay buffers 110 with the first n rows of new search area.

In some embodiments, to avoid idle cycles of processor matrix 102 during buffers 110 reloading, double buffering may be used. During working with an active buffers 110, a back buffers, which are a full copy of buffers 110 (not shown in FIG. 1), is loaded with the first n rows of a new search area and at the end of block, the active and back buffers are switched. In this embodiment, the sliding window a(0) to a(n) of new search area instantly appears at the processor matrix input with no idle cycles.

In some embodiments current block pixels are loaded into EP registers 306 inside matrix processor 102 at the start of new block and are held unchanged during the block processing. In some embodiments the registers may be loaded sequentially one after another. In this case, the processor has to wait until all the registers 306 are loaded and is idling during loading. In some embodiments, the registers 306 may be duplicated, so as one is active and the other is back buffer register. Back buffer registers are loaded with new block pixels during processing current block, at the start of new block active registers are reloaded in parallel from back buffer registers. In these embodiments, there are no idle states of processor matrix but additional (back buffer) registers are required. In some embodiments, the registers 306 may be loaded column by column. In these embodiments, no additional registers are required and there are no idle cycles of the matrix 102 but, the processor need to include additional delay buffers 104 for block rows instead of back buffer register. These embodiments are shown in FIG. 1. Each delay buffer 104 accumulates pixels of one row of current block. At the start of a new block, data from the buffers 104 is loaded into matrix registers 306 in a column by column order.

In some embodiments, the order of the blocks in the image frame may be vertical. In this case, buffers 110 are loaded with search area pixels row by row and EP registers 306 of matrix 102 are loaded with current block pixels column by column. In other embodiments, the order of the blocks may be horizontal. In this case, buffers 110 are loaded column by column and registers 306 are loaded row by row.

The present motion estimation processor architecture is applicable to any block size, any search area size, and any pixel width. A variation in block size affects the number of EP in the matrix 102, a variation in search area size affects the number of processing iterations, and a variation in pixel width affects the width of operation units 302, 304 and registers 306, 308 in each EP of matrix 102. The architecture of the present invention is capable of handling different block sizes and can support sub-partitioning in h.264 standard, mentioned above.

In some embodiments, in order to increase performance, several processor matrices can be used. All operations are distributed among several processor matrices. The distribution is achieved by parallel processing of several blocks; each of which being assigned to a separate processor matrix. In some embodiments, each processor matrix can work with its own search area. In some embodiments when parallel processed blocks are adjacent, the search areas may overlap, an example with 2 blocks is shown on FIG. 4.

Figure 4:
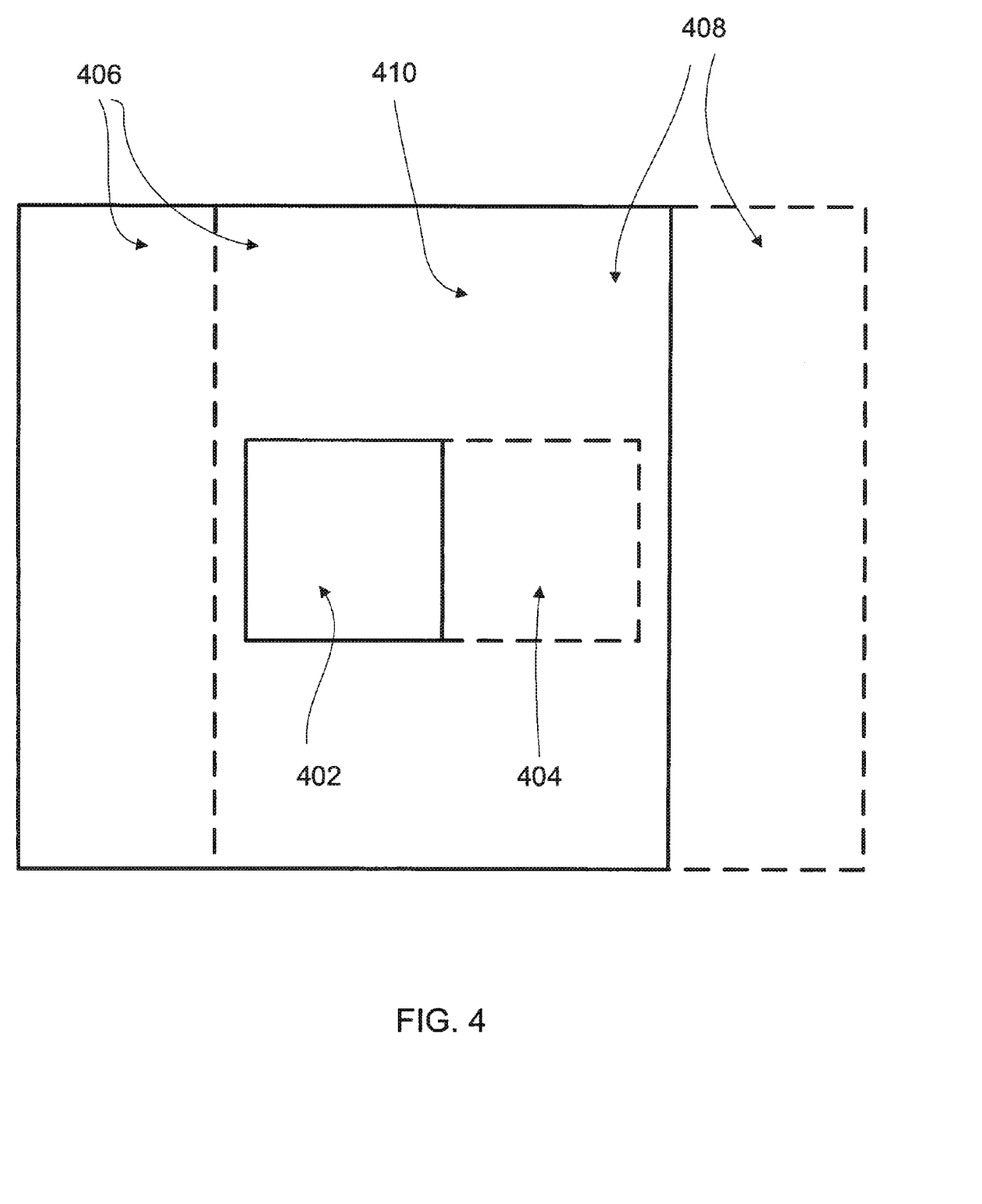
FIG. 4 illustrates search areas overlap, according to some embodiments of the present invention.

FIG. 4 depicts search areas overlap, according to some embodiments of the present invention. As shown, block 402 has a search area 406, and the adjacent block 404 has a search area 408. These search areas overlap each other in a region 410. The overlapped region can be shared between two elementary processors. In this case, the matrices can operate with the same search area that allows reducing the number of accesses to the reference frame in the external memory. When several matrices 102 in FIG. 1 is used, delay buffers 110 in FIG. 1, as well as delay buffers 104, may be individual for each matrix 102 or may be shared between several matrices 102 jointly used for processing adjacent blocks.

Figure 5:
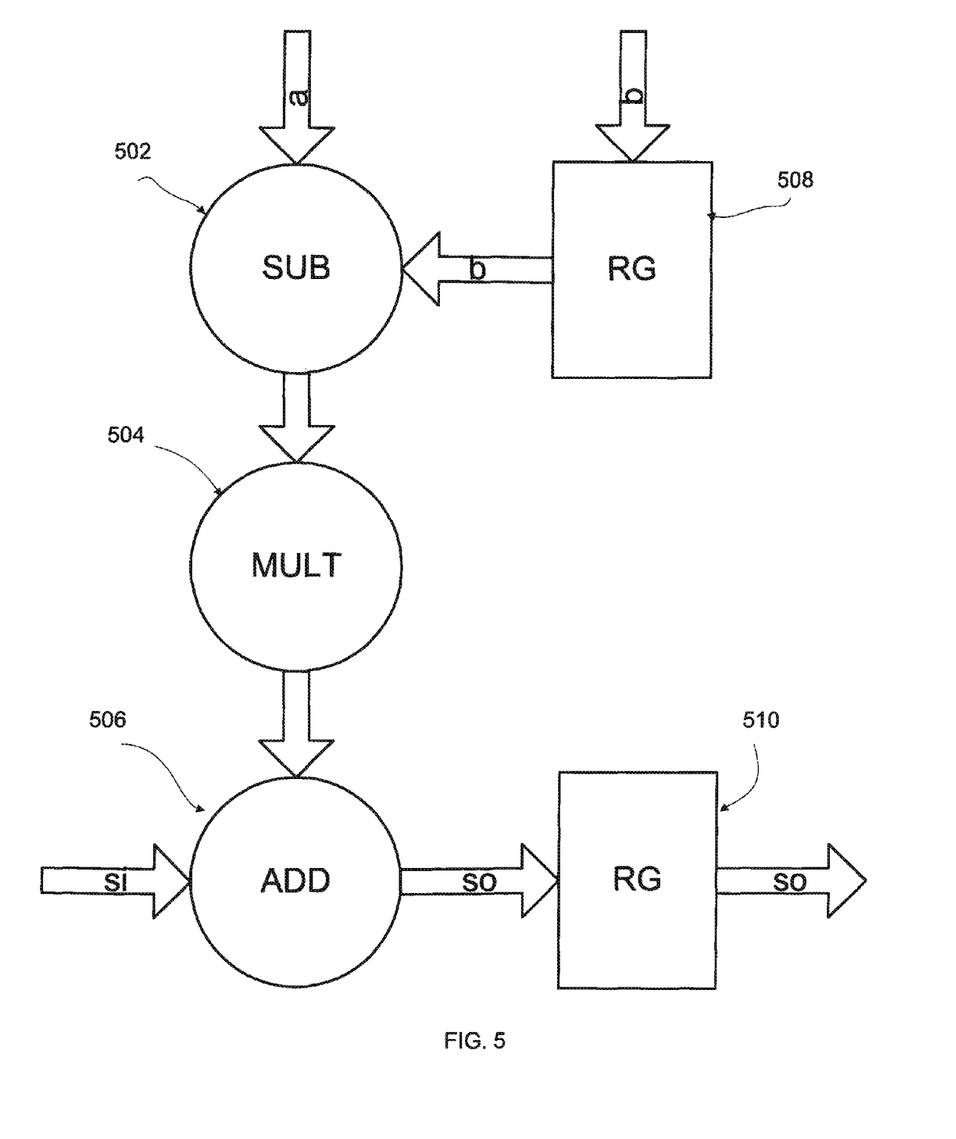
FIG. 5 is an exemplary block diagram of an elementary processor, according to some embodiments of the present invention.

In some embodiments, non-SAD block matching measure may be used. However, the measures need to have the same index space and index dependencies between basic operations as the SAD process presented in the equation (1), above. For example, the same index dependences have SSD and cross correlation measure. SSD and cross correlation measure can be described by the following equations:

$$S(u, v) = \sum_{i=0}^{m-1} \sum_{j=0}^{n-1} (x(i, j) - h(i+u, j+v))^2, \quad (4)$$

$$S(u, v) = \sum_{i=0}^{m-1} \sum_{j=0}^{n-1} x(i, j) \cdot h(i+u, j+v), \quad (5)$$

where x(i, j) are pixels of current block, h are pixels of search area (in the reference frame), m and n are block size, u and v are motion vector components. These equations differ from 1 only in basic operation, in equation 1 it is an absolute difference, in equation 4 it is a squared difference, in equation 5 it is a multiplication. The basic operation affects only the structure of EP and more particularly the operation units of EP. Example of EP for equation 4 is shown on FIG. 5.

FIG. 5 is an exemplary block diagram of an elementary processor, according to some embodiments of the present invention. As shown, subtracter 502 subtracts the operands, multiplier 504 multiplies the out of subtracter 502 by itself, adder 506 adds the output from the previous EP to the output of 504, registers 508 and 510 have a similar function as registers 306 and 308 in FIG. 3. In some embodiments, operations units of EP can be pipelined. This does not affect the architecture of processor and affects only the overall system latency. Thus, in the case of non-SAD measures being used the motion estimation processor includes the same architecture and operation scheduling as in case of SAD measure, the difference being in the EP structure.

In some embodiments, the method of the present invention performs the following: sequencing current frame blocks in row or column frame scan order, sequentially determining a best matched block over all reference block positions in the search area according to indices u and v of equation (1), and parallel computing partial results of SAD for each pixel of said current block for all i and j and for fixed u and v. The method then adds partial SAD results in parallel with respect to i and in pipeline manner with respect to j to generate a set of row SAD results; sums the set of row SAD results in pipeline manner to generate a SAD value for entire block for fixed u and v. It then sequentially obtains a minimum of SAD values for all u and v, and outputs the values of u and v corresponding to said obtained minimum of SAD value, as coordinates of a motion vector.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A parallel processing apparatus for motion estimation between two video frames in a search area of video image frames, the search area including a plurality of blocks of image pixels comprising:
    a matrix of a plurality of elementary processors configured in rows and columns and having a plurality of row inputs for inputting current and reference block rows, a plurality of local connections between the elementary processors for transmitting a partial match result only along matrix rows, and a plurality of row outputs for outputting a set of partial match values with one value for each pixel row of a current block of image pixels;
    a plurality of search area delay buffers coupled to each row of the plurality of row inputs of the matrix, respectively, for accepting pixels of the search area as input and forming a reference block row;
    a plurality of current block delay buffers coupled to each row of the plurality of row inputs of the matrix, respectively, for accepting pixels of the current block as input;
    a sum module coupled to the plurality of row outputs for computing final match values from said plurality of row outputs; and
    a sorting module for sequentially selecting a best match value from the final match values outputted from the sum module, and generating a corresponding motion vector, wherein the current block pixels are inputted into elementary processor registers in parallel and column by column from said current block delay buffers loaded with the current block pixels during a preceding current block processing cycle.

2. The parallel processing apparatus of claim 1, wherein the matrix of elementary processors is configured to transmit the partial match result at every clock cycle from one elementary processor to next elementary processor, and wherein each elementary processor is configured to compute the partial match result for a corresponding pixel of the current block and add the computed partial match result to a partial match result received from a previous elementary processor in a same row of the matrix.

3. The parallel processing apparatus of claim 1, wherein each elementary processor further includes a register for holding a corresponding pixel of the current block.

4. The parallel processing apparatus of claim 3, wherein the current block pixels are inputted into elementary processor registers sequentially.

5. The parallel processing apparatus of claim 3, wherein the current block pixels are inputted into elementary processor registers in parallel from a plurality of corresponding back buffer registers loaded with the current block pixels during a preceding current block processing cycle.

6. The parallel processing apparatus of claim 1, wherein the search area buffers are loaded sequentially at the start of a new block processing.

7. The parallel processing apparatus of claim 1, wherein the search area buffers are loaded in parallel at the start of a new block processing from a plurality of corresponding back buffer registers loaded with a set of first rows of search area during a preceding current block processing cycle.

8. The parallel processing apparatus of claim 1, wherein the current block is loaded to the matrix of the plurality of elementary processors in a horizontal frame scan order.

9. The parallel processing apparatus of claim 1, wherein the current block is loaded to the matrix of elementary processors in a vertical frame scan order.

10. The parallel processing apparatus of claim 1, further comprising a plurality of additional matrixes of a plurality of elementary processors, each matrix of the plurality of elementary processors configured in rows and columns and having a plurality of row inputs, a plurality of local connections between the elementary processors, and a plurality of row outputs, wherein a plurality of current blocks are processed simultaneously by a corresponding matrix.

11. The parallel processing apparatus of claim 1, further comprising a plurality of additional matrixes of a plurality of elementary processors, each matrix configured in rows and columns and having a plurality of row inputs, a plurality of local connections between the elementary processors, and a plurality of row outputs, wherein when processed blocks are adjacent and a plurality of search area overlap, a common search area is processed simultaneously by the plurality of matrixes.

12. The parallel processing apparatus of claim 1, wherein the partial match values are partial sum of absolute differences (SAD) values, and the final match values are SAD values.

13. A method for estimating motion in a search area of video image frames including a plurality of blocks of image pixels, using sum of absolute differences (SAD) as a match criterion, the method comprises:

sequencing current frame blocks in row or column frame scan order;

sequentially determining a best matched block over all reference block positions in the search area according to indices u and v of:

$$S(u, v) = \sum_{i=0}^{m-1} \sum_{j=0}^{n-1} |x(i, j) - h(i + u, j + v)| + \lambda R(u, v), \quad (1)$$

where x(i, j) are pixels of said current block, h is pixels of search area, m and n are block size, u and v are motion vector components, R(u, v) is a function representing vector coding efficiency, and λ is a Lagrange multiplier;

parallel computing partial results of SAD for each pixel of said current block for all i and j and for fixed u and v;

adding partial SAD results in parallel with respect to i and in pipeline manner with respect to j to generate a set of row SAD results;

summing said set of row SAD results in pipeline manner to generate a SAD value for entire block for fixed u and v;

sequentially obtaining a minimum of SAD values for all u and v; and outputting values of u and v corresponding to said obtained minimum of SAD value, as coordinates of a motion vector.

14. The method of claim 13, wherein the current block pixels x(i, j) are processed in parallel from a plurality of corresponding back buffer registers loaded with the current block pixels during a previous block processing cycle.

15. The method of claim 13, wherein the sum in equation (1) for all iterations i and j and for all u and v is implemented as $$t1 := x(i,j) - h(i+u, j+v) \quad (2)$$

if t1<0 then $$so := si - t2;$$

else $$so := si + t2;$$

end if;

wherein si is the partial result of sum from previous iteration, and so is the partial result of sum of current iteration.

* * * * *